United States Patent [19]
Knapp

[11] Patent Number: 6,009,360
[45] Date of Patent: Dec. 28, 1999

[54] ENGINE ANALYZER WITH REAL-TIME DIGITAL DISPLAY

[75] Inventor: Benjamin P. Knapp, Byron Center, Mich.

[73] Assignee: SPX Corporation, Muskegon, Mich.

[21] Appl. No.: 08/726,673

[22] Filed: Oct. 7, 1996

[51] Int. Cl.[6] .................................................. G06F 11/32
[52] U.S. Cl. ................................ 701/29; 701/33; 701/99
[58] Field of Search ................................. 701/29, 33, 35, 701/99, 102, 115

[56] References Cited

U.S. PATENT DOCUMENTS

| | | | |
|---|---|---|---|
| 3,630,076 | 12/1971 | Staudt | 73/117.3 |
| 4,125,894 | 11/1978 | Cashel et al. | |
| 4,179,922 | 12/1979 | Bouverie et al. | 73/116 |
| 4,267,569 | 5/1981 | Baumann et al. | |
| 4,270,174 | 5/1981 | Karlin et al. | |
| 4,399,407 | 8/1983 | Kling et al. | 324/379 |
| 4,404,639 | 9/1983 | McGuire et al. | 701/35 |
| 4,418,388 | 11/1983 | Allgor et al. | |
| 4,476,531 | 10/1984 | Marino et al. | |
| 4,796,206 | 1/1989 | Boscove et al. | 701/99 |
| 4,812,768 | 3/1989 | Quinn | 324/379 |
| 4,853,850 | 8/1989 | Krass, Jr. et al. | 701/35 |
| 4,903,220 | 2/1990 | Johnson | 701/29 |
| 4,980,845 | 12/1990 | Govekar | 364/550 |
| 5,063,515 | 11/1991 | Kunst et al. | |
| 5,245,324 | 9/1993 | Jonker et al. | 345/134 |
| 5,247,287 | 9/1993 | Jonker et al. | 345/134 |
| 5,250,935 | 10/1993 | Jonker et al. | 345/134 |
| 5,318,449 | 6/1994 | Schoell et al. | 701/33 |
| 5,387,870 | 2/1995 | Knapp et al. | 324/379 |
| 5,729,452 | 3/1998 | Smith et al. | 701/29 |

Primary Examiner—William A. Cuchlinski, Jr.
Assistant Examiner—Ed Pipala
Attorney, Agent, or Firm—Kinney & Lange, P.A.

[57] ABSTRACT

An engine analyzer senses the electrical signals of a combustion engine and displays a representation of the signals on a display that is shared with a separately operable computer platform. The representation of the signals is digital and is in real-time. The display of the signals does not affect the computational burden on the separately operable computer.

49 Claims, 7 Drawing Sheets

ENGINE ANALYZER WITH REAL-TIME DIGITAL DISPLAY

BACKGROUND OF THE INVENTION

The present invention relates to combustion engine analyzers. More specifically it relates to engine analyzers that can display a real-time digital representation of electrical engine signals on a stand-alone computer's display.

Engine analyzers are electronic diagnostic tools used to sense, display, and analyze electrical signals from combustion engines. An engine analyzer senses the electrical signals, which are usually in the form of time-varying voltage signals, through leads attached to portions of the engine. Analyzers are able to choose from a plurality of electrical signals created by the combustion engine and are also able to monitor selected signals for a variety of anomalies. These anomalies can be conveyed to a user along with a display of waveforms, showing the anomalies.

In addition, many analyzers are able to provide a real-time display of ignition signals. Initially, this was accomplished using the time varying voltage of a signal to directly control the vertical deflection of a display beam with a fixed horizontal scan rate. In more recent analyzers, the sensed ignition signal is converted into a series of digital values that are used to control the display beam.

In these "digital" analyzers, analog ignition signals are sampled at desired time intervals to create a series of digital values. The digital values are placed in a digital memory that is later accessed to create the display. Each digital value represents one pixel of the display so the values must be accessed in the order they are to be displayed. The display is created by rastering a display beam across the screen; beginning in the top left corner of the display and scanning across in successive rows until reaching the bottom right of the display. During the rastering, the beam, or beams in the case of a multi-color display, are activated by the values accessed from memory.

In prior analyzers, the display is dedicated to the analyzer. Thus, prior art displays are limited to showing analyzer waveforms and analysis, and can not display other useful information such as ideal waveforms, parts lists, or an engine's repair history. In addition, microprocessors within the analyzer are dedicated to displaying and extracting ignition signals. The analyzers do not include microprocessors that are free to execute programs unrelated to the display of ignition signals.

SUMMARY OF THE INVENTION

The present invention is a motorized vehicle information system for accessing and manipulating information relating to motorized vehicles. The information system includes a computer having user input and output interfaces and a microprocessor coupled to both interfaces. The system also includes a monitoring system coupled to a motorized vehicle and the computer. The monitoring system monitors attributes of the motorized vehicle and provides attribute signals to the computer representative of the monitored attributes. At least one of the attribute signals is created by sampling a version of a monitored attribute. The sampling used to create such an attribute signal is controlled by a sampling rate determined by the monitoring system. At least one attribute signal from the monitoring system is capable of appearing is a real time perceivable output at the computer's output interface.

In preferred embodiments the computer is a stand alone computer, such as a personal computer. The independent nature of the computer allows it to execute instructions that are not related to monitoring or displaying attributes of the motorized vehicle. Instead, the computer may execute any number of programs including spread sheets, billing programs, and retrieval programs used to locate ideal attribute signals and parts lists. The fact that the monitoring system does not burden the computer while monitoring the attributes of the motorized vehicle, including while setting the sampling period for sampling attributes of the motorized vehicle, the monitoring system is able to free the computer to perform these other functions. This greatly expands the type and amount of tasks that the information system is able to accomplish in comparison to prior art information systems.

Although the computer and monitoring system are for the most part separated, in preferred embodiments the computer is able to issue commands to the monitoring system, and is able to receive attribute signals from the monitoring system that are capable of appearing as real-time perceivable outputs at the computer's output interface. This permits the computer to not only control the monitoring system, but also to display the results of the monitoring system in real time. This allows a user to control both the computer and the monitoring system using a single interface, thereby simplifying the user's interaction with both the computer and the monitoring system.

In order to provide a signal which may appear in real time at the computer's output interface, the monitoring system must synchronize its output signal to the computer's output interface. This requires that the monitoring system produce sample values at a rate consistent with the rate at which the computer outputs values to the output interface. It also requires that the monitoring system provide samples in the order required by the computer's output interface.

To accomplish this, preferred embodiments of the monitoring system use a ping-pong memory system that permits the monitoring system to store values in one set of memory locations while values are being read from a separate set of memory locations. In addition, the monitoring system of preferred embodiments breaks each set of memory locations into parallel sections, each addressable by an identical set of memory addresses. This permits the monitoring system to reset the memory locations in two separate memory sections by applying the same set of addresses at the same time to two different memory sections. This technique may also be used to read memory values from two separate memory sections at the same time using the same memory address. The division of the memory into a ping-pong memory and further into parallel sections of memory, allows the monitoring system to provide samples at a rate demanded by the output interface.

Through these techniques, and other techniques discussed further in the application, the present invention is able to use a stand alone computer, such as a personal computer, to control an engine analyzer while receiving real-time signals from the engine analyzer which may be displayed on the computer's output monitor. This greatly increases the flexibility and functionality of both the personal computer and the engine analyzer.

DETAILED DESCRIPTION OF THE PREFERRED EMBODIMENTS

Figure 1:
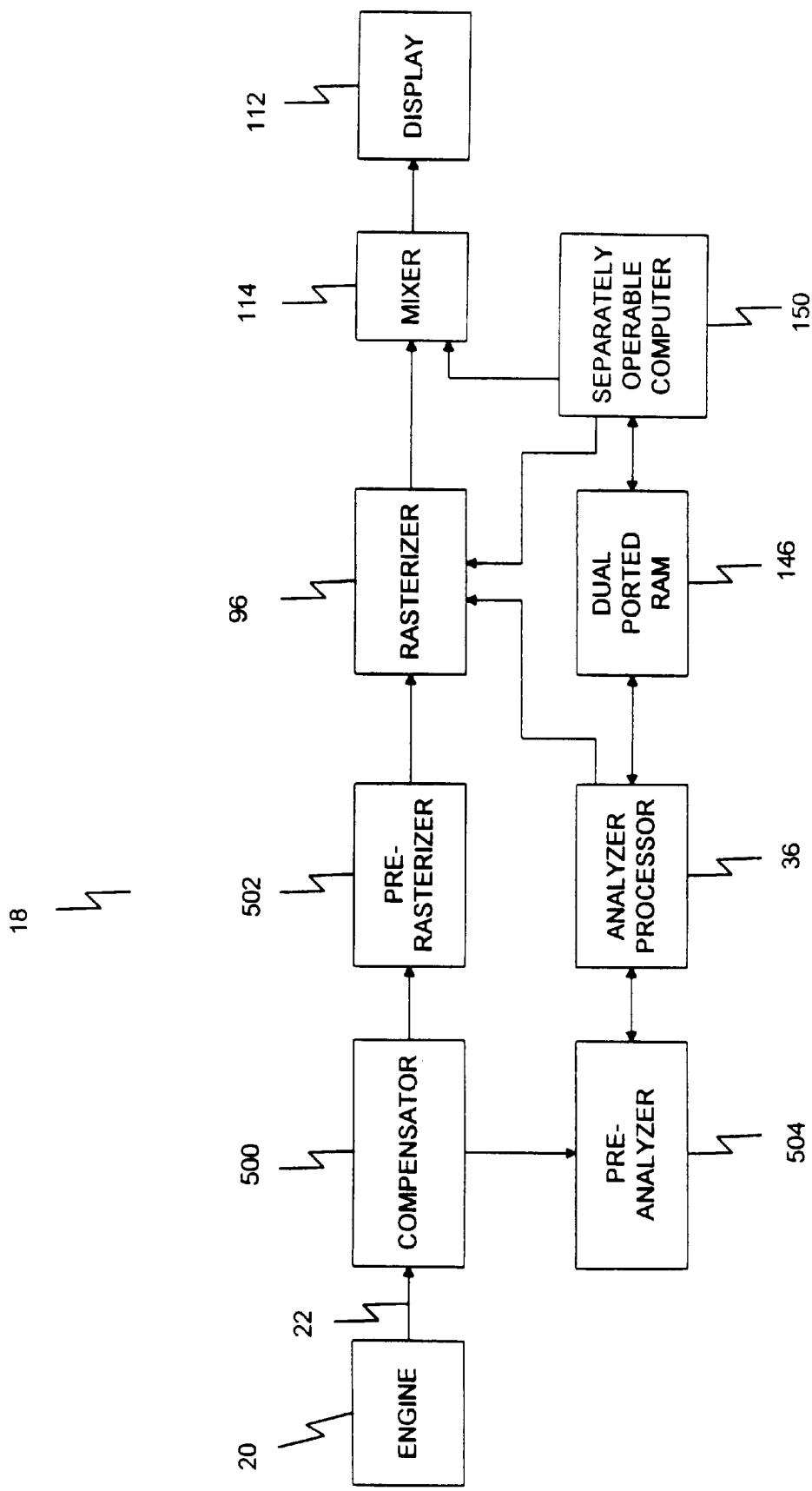
FIG. 1 is a generalized block diagram of an engine analyzer display system of the present invention.

FIG. 1 is a block diagram of engine 20 and analyzer system 18 of the present invention. Engine 20 creates a plurality of electrical signals during its operation including: a low voltage primary signal from the primary winding of the engine's ignition signal; a high voltage secondary signal from the secondary winding of the ignition signal; a first cylinder signal from the spark plug of the first cylinder; a battery signal from the non-ground terminal of the battery; and a vacuum transducer signal which is a linear function of the pressure at the intake manifold. These signals are transmitted to compensator 500 via sensing lines 22 which are connected to various parts of engine 20.

Sensing lines 22 are input to compensator 500, which modifies the values on the various sensing lines so that all of the values fall within a prescribed range. Compensator 500 also produces clock signals which are used by the remainder of the analyzer system to synchronize the operation of the system to the speed of engine 20. Compensator 500 provides compensated values to pre-analyzer 504 and pre-rasterizer 502.

Pre-analyzer 504 further compensates the values from compensator 500 and samples the compensated values under a criterion and at a rate indirectly set by analyzer processor 36. Pre-analyzer 504 stores the sampled values in a memory which analyzer processor 36 may access as required.

Analyzer processor 36 accesses the values in pre-analyzer 504 to extract desired features from the signals stored in pre-analyzer 504, and to analyze certain features of the stored signals. For instance, analyzer processor 36 may calculate an average firing peak in the engine's ignition signal and then detect and report variations from that average. The operation of analyzer processor 36 in this capacity is discussed further below.

Values extracted by analyzer processor 36 are communicated to dual ported RAM 146, which conveys the values to separately operable computer 150. Separately operable computer 150 also uses dual ported RAM 146 to issue commands to analyzer processor 36. These commands control analyzer processor 36 and thereby control the features extracted by analyzer processor 36 as well as the real-time signals displayed by analyzer system 18. Separately operable computer 150 also includes a user input interface (not shown), which permits the user to input values and instructions to separately operable computer 150.

The compensated values from compensator 500 are also input to pre-rasterizer 502. Pre-rasterizer 502 samples the compensated values and stores the sampled values in a memory within pre-rasterizer 502. Rasterizer 96 accesses the memory in pre-rasterizer 502 to acquire one or more sampled values as it needs them.

Rasterizer 96 converts the sampled values into a series of displayable values appropriate for video display 112, which is preferably part of separately operable computer 150 but which is shown separately in FIG. 1 for simplicity. Rasterizer 96 is controlled both by analyzer processor 36 and separately operable computer 150. As discussed further below, separately operable computer 150 provides synchronization signals to rasterizer 96 so that the output signals from rasterizer 96 are synchronized to the output display signals of separately operable computer 150. Analyzer processor 36 controls the color and location of the eventual real-time display by issuing commands to rasterizer 96.

The display outputs of rasterizer 96 and separately operable computer 150 are input to mixer 114, which combines the display signals from the two sources to produce a single display signal which is output to display 112.

As discussed further below, the separation of separately operable computer 150 from analyzer processor 36 permits separately operable computer 150 to execute software programs independent of the analysis performed by analyzer processor 36 and the display signal created by rasterizer 96. This greatly reduces the load on separately operable computer 150 and increases the functionality of analyzer system 18.

Figure 2:
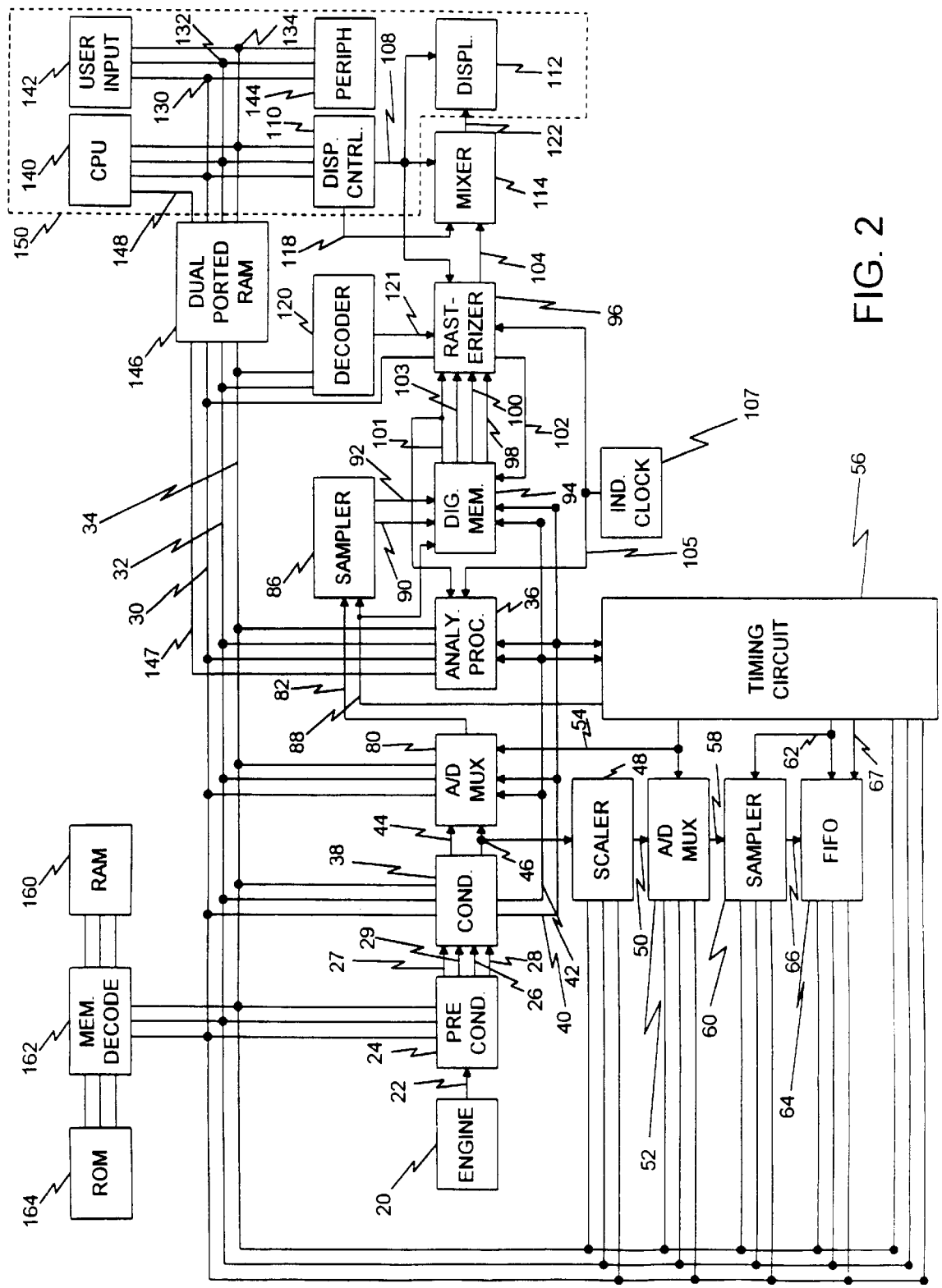
FIG. 2 is an expanded block diagram of the engine analyzer display system of FIG. 1.

FIG. 2 is an expanded block diagram of engine 20 and analyzer system 18 of FIG. 1.

Engine 20 provides signals on sensing lines 22 to pre-conditioner 24, which, with conditioner 38, constitutes compensator 500 of FIG. 1. Pre-conditioner 24 selects one or more of the signals on sensing lines 22, and assigns each selected signal to one of two outputs, CHANNEL A 26 or CHANNEL B 28. The selection is made in response to signals received on DATA BUS 30, ADDRESS BUS 32, and CONTROL BUS 34 from analyzer processor 36. In preferred embodiments, control values are transmitted along DATA BUS 30 and latched into pre-conditioner 24 by decoding an address or. ADDRESS BUS 32, which, with one or more control signals on CONTROL BUS 34, indicates that the values on DATA BUS 30 are intended for the pre-conditioner. Pre-conditioner 24 preferably includes a multiplexer, which is able to switch between signals quickly so that multiplexed portions of two or more signals can be output on a single channel in certain modes of operation.

Pre-conditioner 24 also outputs two timing signals, CYLINDER SYNC 27 and ENGINE SYNC 29. CYLINDER SYNC 27 rapidly changes voltage each time a cylinder in engine 20 fires. ENGINE SYNC 29 rapidly changes voltage each time the number one cylinder of engine 20 fires.

The signals; on CHANNEL A 26, CHANNEL B 28, ENGINE SYNC 29 and CYLINDER SYNC 27 are input to conditioner 38 which also receives DATA BUS 30, ADDRESS BUS 32, and CONTROL BUS 34. Conditioner 38 converts the signals on ENGINE SYNC 29 and CYLINDER SYNC 27 into two clock signals: ENGINE CLOCK 40 and CYLINDER CLOCK 42. ENGINE CLOCK 40 is a digital signal which goes high for one time period when the first cylinder fires. CYLINDER CLOCK 42 goes high for one time period each time points of the engine open, an event which is coincident with cylinder firings.

Conditioner 38 also normalizes each input signal on CHANNEL A 26 and CHANNEL B 28 so that each signal is within a certain voltage range to produce signals ANALOG A 46 and ANALOG B 44, which are normalized versions of the signals on CHANNEL A 26 and CHANNEL B 28, respectively. For instance, the high voltage secondary signal has a maximum voltage of 10–30 kv and the low voltage primary signal has a maximum voltage of 12–100 volts. Conditioner 38 normalizes these signals so that they both fall within a displayable range of voltages. This helps to reduce the number of components needed to display all of the signals from engine 20. The normalization circuits found in conditioner 38 are well knowing in the art.

Conditioner 38 can also apply D.C. bias signals to portions of the input signals to help differentiate different parts of the input signals. For instance, in a complete engine cycle, the primary signal will include a separate firing signal for Mach cylinder of the engine. By applying a different D.C. bias to each cylinder, conditioner 38 differentiates each cylinder firing and, as discussed further below, this differentiation can be used by a display unit to display the cylinder firing patterns in various configurations. Specifically, by adding D.C. bias signals that are incrementally different from each other, conditioner 38 makes it possible to display the cylinder firing patterns in a stack mode, with the patterns stacked vertically on the screen.

Both the normalization and the D.C. bias added by conditioner 38 are controlled by commands received from analyzer processor 36 along DATA BUS 30. Like preconditioner 24, conditioner 38 decodes the value on ADDRESS BUS 32 and CONTROL BUS 34 to determine if the values of DATA BUS 30 are intended for conditioner 38. When the values are for conditioner 38, the values are latched into conditioner 38, giving conditioner 38 unrestricted access to the values at all times.

ANALOG A 46 is input to scaling circuit 48, which is coupled to DATA BUS 30, ADDRESS BUS 32, and CONTROL BUS 34. Scaling circuit 48 along with Analog-to-Digital converter 52, sampler 60, and First-In-First-Out 64, form pre-analyzer 504 of FIG. 1. Scaling circuit 48 adjusts ANALOG A 46 so that it is in a better form to be analyzed by analyzer processor 36. Specifically, it amplifies many of the signals which appear on ANALOG A 46, so that it is easier to extract features from the signals. The features that are extracted and the analysis performed by analyzer processor 36 are discussed further below and in detail in U.S. Pat. No. 5,387,870, entitled METHOD AND APPARATUS FOR FEATURE EXTRACTION FROM INTERNAL COMBUSTION ENGINE IGNITION WAVEFORMS. The amount of adjustment applied to each signal is dependent on the signal present in ANALOG A 46 and is controlled by control signals found on DATA BUS 30 at times when the address on ADDRESS BUS 32 indicates that the values on DATA BUS 30 are intended for scaling circuit 48.

Scaling circuit 48 produces SCALED A 50, which is input to Analog-to-Digital (A/D) converter 52. The analog signal of SCALED A 50 is sampled by A/D converter 52 at a preferred sampling rate of 2.5 MHz, with each sample converted to an eight-bit digital value representative of the analog value at the time of sampling. The sampling rate is controlled by A/D CLOCK 54 from timing circuit 56. The eight-bit digital samples are passed to sampler 60 as DIGITAL SIGNAL 58.

Sampler 60 acts to select one digital sample out of every N digital samples in DIGITAL SIGNAL 58. The particular sample chosen can be an arbitrary value, the largest or smallest absolute value, or the most positive or most negative value. The selection criteria are controlled by control signals found on DATA BUS 30, which are latched into sampler 60 when the values on CONTROL BUS 34 and ADDRESS BUS 32 indicate that the values on DATA BUS 30 are intended for sampler 60. The value of N is controlled by SAMPLE CLOCK 62 from timing circuit 56 which creates SAMPLE CLOCK 62 in a manner described further below.

The samples selected by sampler 60 are passed to First-In-First-Out (FIFO) 64 as SAMPLE 66. FIFO 64 is an elastic memory device that stores values with each pulse at its input clock. Values are read out of FIFO 64 in the same order in which they are stored.

The values stored in FIFO 64 are nine-bit values, eight-bits of which are from eight-bit SAMPLE 66. The ninth-bit is a synchronization bit sampled from SYNC SIGNAL 67. SYNC SIGNAL 67 is sampled by FIFO 64 with each pulse on SAMPLE CLOCK 62, which is input to the clock input of FIFO 64. Timing circuit 56 produces SYNC SIGNAL 67 as a combination of ENGINE CLOCK 40 and CYLINDER CLOCK 42 in a manner discussed further below.

Analyzer Processor 36 regards FIFO 64 as one of its memory locations. It acquires the value from FIFO 64 by issuing an address on ADDRESS BUS 32 and proper control signals on CONTROL BUS 34 to cause FIFO 64 to place a nine bit value on DATA BUS 30. Analyzer processor 36 extracts certain features from the digitized engine waveforms output by FIFO 64. In particular, analyzer processor 36 is able to analyze different characteristics Of the engine waveform such as firing peak, firing line, oscillations, and dwell. Through this analysis, analyzer processor 36 is able to detect and extract waveforms which are indicative of one or more mechanical problems in the engine. As discussed in U.S. Pat. No. 5,387,870 entitled METHOD AND APPARATUS FOR FEATURE EXTRACTION FROM INTERNAL COMBUSTION ENGINE WAVEFORMS, and as discussed further below, these anomalies are reported to a separate processor which conveys the anomalies to the user through a display. Details of the types of analysis performed may be found in U.S. Pat. No. 5,387,870.

As mentioned above, timing circuit 56 produces numerous timing signals to control the sampling and storage of values. Specifically, timing circuit 56 produces A/D clock 54, SAMPLE CLOCK 62, SYNC SIGNAL 67, and DISPLAY SAMPLE CLOCK 88. Each of these timing signals is created in response to control values from analyzer processor 36 that are placed on DATA BUS 30 for timing circuit 56.

A/D CLOCK 54 is a 2.5 MHz clock signal used to set the sampling rate of A/D converter 52. In preferred embodiments, A/D CLOCK 54 is also used to set the sampling rate of A/D converters 80, which convert ANALOG A 46 and ANALOG B 44 into digital values.

SAMPLE CLOCK 62 is used to set the sample rate of sampler 60 and the rate at which FIFO 64 accepts values. In preferred embodiments, timing circuit 56 sets SAMPLE CLOCK 62 to a fixed value that is dependent upon the speed of analyzer processor 36. For instance, if analyzer processor 36 is a microprocessor operating at 20 MHz, the sampling rate of SAMPLE CLOCK 62 is preferably 50 KHz.

Timing circuit 56 also produces SYNC SIGNAL 67 which is based on ENGINE CLOCK 40 and CYLINDER CLOCK 42 received by timing circuit 56 from conditioner 38. SYNC SIGNAL 67 is nearly identical to CYLINDER CLOCK 42 except when a pulse on CYLINDER CLOCK 42 and ENGINE CLOCK 40 coincide. At that point, timing circuit 56 places one clock cycle of SAMPLE CLOCK 62 on SYNC SIGNAL 67. Since one clock cycle of SAMPLE CLOCK 62 is much shorter than a pulse on CYLINDER CLOCK 42, one clock cycle of SAMPLE CLOCK 62 appears as a short clock cycle within a pattern of larger clock pulses which constitute the bulk of SYNC SIGNAL 67. The inclusion of SYNC SIGNAL 67 as the ninth bit stored in FIFO 64 makes it possible to establish the time at which certain events occurred. Analyzer processor 36 uses the ninth bit of FIFO 64 as an indication of whether a current value was stored in FIFO 64 at the beginning of a new cylinder or a new engine cycle. DISPLAY SAMPLE CLOCK 88 sets the rate at which sampler 86, discussed further below, samples values for later real-time display. This rate is set by timing circuit 56, after considering the current speed of the engine, the type of signal being displayed, and the format of the display. The rate of DISPLAY CLOCK 88 is discussed further below in connection with sampler 86.

In addition to providing signals to scaling circuit 48, conditioner 38 provides ANALOG A 46 and ANALOG B 44 to A/D multiplexer 80. A/D multiplexer 80 is an analog to digital converter and multiplexer that is controlled by analyzer processor 36 through signals on DATA BUS 30, ADDRESS BUS 32 and CONTROL BUS 34. A/D multiplexer 80, sampler 86 and digital memory 94, are part of pre-rasterizer 502 of FIG. 1. A/D multiplexer 80 includes two separate analog-to-digital converters that convert the analog signals on ANALOG A 46 and ANALOG B 44 to eight-bit digital samples by sampling the signals at the clock rate set by A/D CLOCK 54, which is preferably 2.5 MHz. A/D multiplexer 80 outputs eight-bit DIGITAL A/B 82, which can be digital samples of ANALOG A 46, ANALOG B 44 or an interleaved combination of samples from ANALOG A 46 and ANALOG B 44.

When DIGITAL A/B 82 includes interleaved samples, the interleaving can be performed on a sample-by-sample basis, or on a screen-by-screen basis. In a sample-by-sample basis, DIGITAL A/B 82 includes alternating samples of ANALOG A 46 and ANALOG B 44. When the samples are interleaved on a screen-by-screen basis, each interleaved portion from ANALOG A 46 arid ANALOG B 44 contains enough samples to fill the entire display screen. For instance, DIGITAL A/B 82 can carry a screen's worth of samples from ANALOG A 46 followed by a screens worth of samples from ANALOG B 44. The amount of samples needed to fill the entire screen is dependent upon the type of signal being displayed.

Analyzer processor 36 initializes A/D multiplexer 80 via DATA BUS 30, ADDRESS BUS 32 and CONTROL BUS 34 so that A/D multiplexer 80 knobs whether a new screen is to begin at each cylinder clock pulse or at each engine clock pulse. Once initialized, A/D multiplexer 80 uses ENGINE CLOCK 40 or CYLINDER CLOCK 42 to switch between the samples from ANALOG A 46 and ANALOG B 44, if screen-by-screen multiplexing is desired. If sample-by-sample multiplexing is desired, A/D multiplexer 80 switches between samples with each cycle of A/D CLOCK 54. Otherwise, A/D multiplexer 80 continuously provides samples from either ANALOG A 46 or ANALOG B 44.

DIGITAL A/B 82 is input to sampler 86 which samples the signal at a sampling rate determined by DISPLAY SAMPLE CLOCK 88 from timing circuit 56. The sampling period is calculated by timing circuit 56 based upon the frequency of cylinder firings occurring in engine 20 and the format in which the waveforms will be displayed. As the frequency of the cylinder firings increases, the sampling frequency increases so that the number of samples per cylinder firing remains relatively constant.

The format in which the waveforms will be displayed affects the sampling rate because different formats require different numbers of samples per screen. For instance, if the primary signal is to be displayed in a "stacked" format, with each cylinder firing aligned vertically on the screen, more samples per cylinder firing will be taken than if the primary signal is displayed in parade format where the cylinder firings are aligned horizontally. The number of samples needed for the stacked format is larger than the number needed for the parade format because in the stacked format each cylinder firing is shown in the amount of horizontal display space used to display the entire engine cycle in the parade format. Thus, in the stacked format, the number of samples for each individual cylinder firing should be the same as the number of samples for all of the cylinder firings in the parade format. For example, if 512 samples are enough to fill the present horizontal display space, the total number of samples taken in the parade format would be 512, spread evenly across all of the cylinder firings found in an engine cycle. However, in the stacked format, 512 samples would be taken from each cylinder firing and for an engine with 4 cylinders this would result in 2048 samples per engine cycle.

Thus, in order to set the frequency of DISPLAY SAMPLE CLOCK 88, timing circuit 56 must consider the frequency of the engine, the number of cylinders in the engine, and the display format. The frequency of the engine and the number of cylinder firings per engine cycle is determined directly from ENGINE CLOCK 40 and CYLINDER CLOCK 42, which timing circuit 56 receives from conditioner 38. The display format is received by timing circuit 56 along DATA BUS 30 from analyzer processor 36.

During each sampling period of DISPLAY SAMPLE CLOCK 88, sampler 86 preferably selects two samples representing the maximum and minimum digital values on DIGITAL A/B 82. These eight-bit values may be sampled in a manner discussed further below in connection with FIG. 3. This creates a series of maxima and minima, one maximum and one minimum selected during each sampling period. The maxima are output as eight-bit SAMPLED HIGH 90 and the minima are output as eight-bit SAMPLED LOW 92.

Both SAMPLED HIGH 90 and SAMPLED LOW 92 are input to digital memory 94. Digital memory 94 permits data on SAMPLED HIGH 90 and SAMPLED LOW 92 to be stored in parallel at a first rate and retrieved in parallel at a second, variable rate, on a first-in-first-out basis. This allows data to be stored in parallel as it occurs, independent of functions later performed on the data. Digital memory 94 stores an additional ninth bit with each of the eight-bit samples on both SAMPLED HIGH 90 and SAMPLED LOW 92. The ninth bit added to SAMPLED HIGH 90 represents the value of ENGINE CLOCK 40 at the time a sample from SAMPLED HIGH 90 is stored. The ninth-bit added to SAMPLE LOW 92 represents the value of CYLINDER CLOCK 42 at the time a sample from SAMPLED LOW 92 is stored.

Digital memory 94 releases two series of eight-bit values to rasterizer 96 as DELAYED HIGH 98 and DELAYED LOW 100 in response to F-READ 102, a signal issued by rasterizer 96. The values of DELAYED HIGH 98 represent the retrieved values of SAMPLE HIGH 90 and the values of DELAYED LOW 100 represent the retrieved values of SAMPLE LOW 92. Digital memory 94 also releases POST-FIFO ENGINE CLOCK 101, which is the ninth bit associated with DELAYED HIGH 98 and which represents the state of ENGINE CLOCK 40 at the time the current value on DELAYED HIGH 98 was stored. POST-FIFO ENGINE CLOCK 101 is input to analyzer processor 36 as an interrupt that allows analyzer processor 36 to monitor the state of the engine cycle being displayed. POST-FIFO ENGINE CLOCK 101 is also input to rasterizer 96, which uses the signal to synchronize its operation.

Rasterizer 96 also receives POST-FIFO CYLINDER CLOCK 103, which is the ninth bit associated with DELAYED LOW 100. POST-FIFO CYLINDER CLOCK 103 represents the value of CYLINDER CLOCK 42 at the time an associated value on SAMPLED LOW 92 was stored in digital memory 94. POST-FIFO CYLINDER CLOCK 103 is input to rasterizer 96 and used by rasterizer 96 to synchronize its operation.

Rasterizer 96 converts DELAYED HIGH 98 and DELAYED LOW 100 into RASTER 104, which is comprised of a series of four-bit digital nibbles, each digital nibble representing a value for one pixel on the display. The occurrence of the first digital nibble for each complete screen on the display is controlled both by SYNCHRONIZATION signals 108 from display controller 110 and POST-FIFO ENGINE CLOCK 101. SYNCHRONIZATION signals 108 indicate when the display is ready to begin a new screen and POST-FIFO ENGINE CLOCK 101 indicates when there is a new engine cycle to be displayed. By using both values, rasterizer 96 synchronizes the display to the beginning of an engine cycle, thereby increasing the stability of the displayed image.

Rasterizer 96 also receives data and commands from analyzer processor 36 via DATA BUS 30 and decoder 120 which decodes values on ADDRESS BUS 32 arid CONTROL BUS 34 into CONTROLS 121. Rasterizer 96 further receives CLOCK signal 105 from independent clock 107, which sets the frequency at which rasterizer 96 operates. CLOCK signal 105 also sets the frequency at which analyzer processor 36 operates. This helps keep rasterizer 96 and analyzer processor 36 synchronized.

Mixer 114 is connected to rasterizer 96 and receives RASTER 104. Mixer 114 also receives DISPLAY signal 118 and SYNCHRONIZATION signals 108 from display controller 110. DISPLAY signal 118 comprises a series of four-bit digital nibbles similar to those found in RASTER 104. Display controller 110 produces DISPLAY signal 118 from data found on DATA BUS 130 which is read by display controller 110 when an address on ADDRESS BUS 132 and control values on CONTROL BUS 134 indicate that central processor 140 has placed pixel nibbles on DATA BUS 130.

Figure 6:
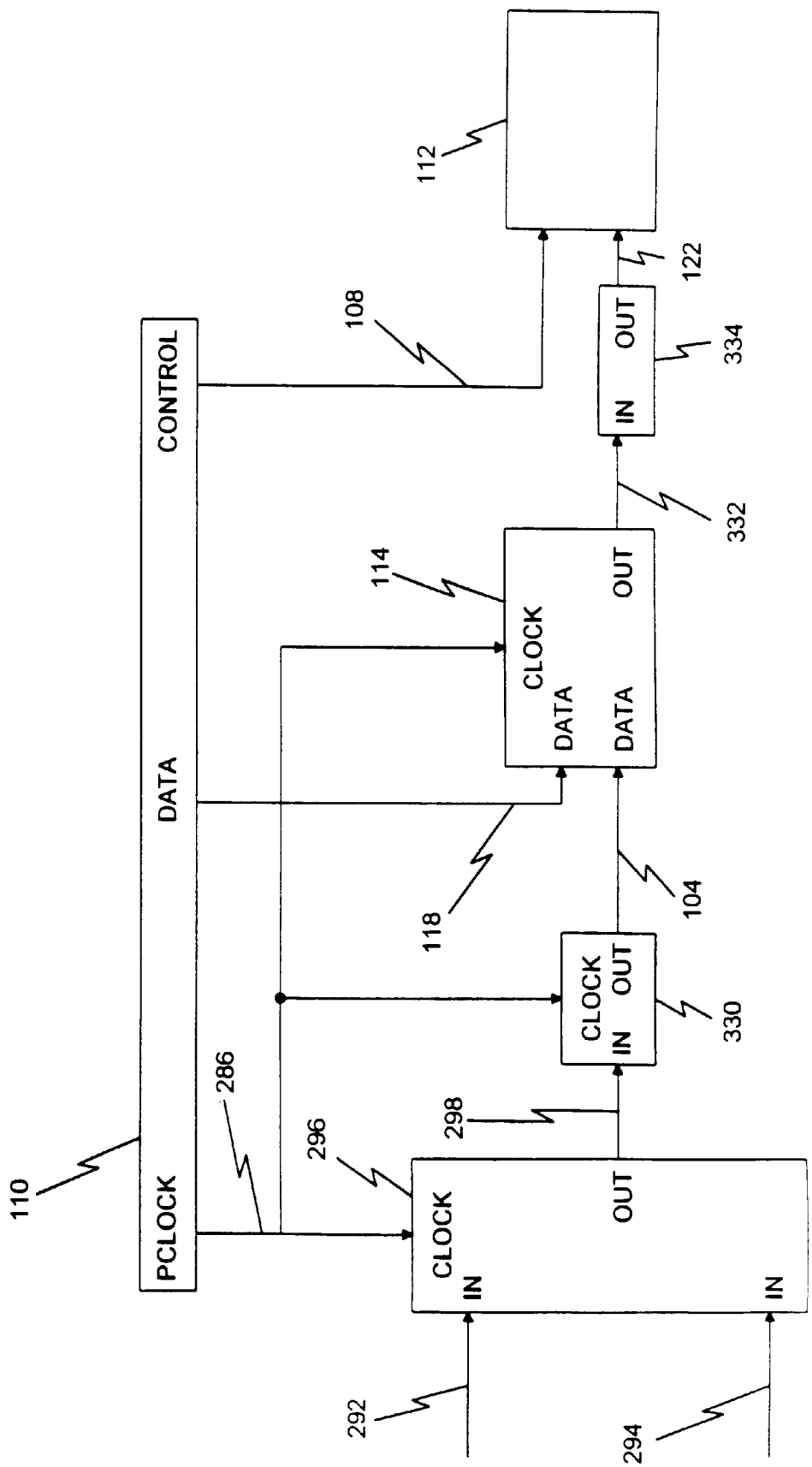
FIG. 6 is a block diagram of a third portion of rasterizer 96, mixer 114 and display 112, all of FIG. 2.

Display controller 110 synchronizes the occurrence of the digital nibbles in both RASTER 104 and DISPLAY signal 118 so that at any given time the four-bit digital nibble found on RASTER 104 and the four-bit digital nibble on DISPLAY signal 118 represent values for the same pixel. Mixer 114 combines RASTER 104 and DISPLAY signal 118 by selecting between pairs of four-bit digital nibbles that appear at mixer 114. After selecting one of the digital nibbles, mixer 114 passes the nibble to a color pallet, which is not shown in FIG. 2 for simplicity but which is shown in FIG. 6. The color pallet uses the selected digital nibble to chose a color value. That color value is then transmitted as COLOR 122.

Display 112 receives COLOR 122 from the color pallet and SYNCHRONIZATION signals 108 from display controller 110. Display 112 uses COLOR 122 and SYNCHRONIZATION signals 108 to trace out a color pattern on a display screen. Preferably, display 112 traces the pattern by sweeping a collection of electron beams across a phosphor coated surface. The sweeping of the beams is controlled by SYNCHRONIZATION signals 108 and the modulation of the beams is controlled by COLOR 122.

Analyzer processor 36 receives commands from and exchanges data with central processor 140 through dual ported RAM 146, which has separate connections to DATA BUS 30, ADDRESS BUS 32, and CONTROL BUS 34 associated with analyzer processor 36; and with DATA BUS 130, ADDRESS BUS 132 and CONTROL BUS 134 associated with central processor 140. To send commands to analyzer processor 36, central processor 140 writes the commands into dual ported RAM 146 along with a DOWNLOAD command placed in a specific memory location of dual ported RAM 146 that causes the dual-ported RAM to issue an interrupt to analyzer processor 36 along INTERRUPT-AP 147. Upon receiving the interrupt, analyzer processor 36 executes the DOWNLOAD command and transfers the contents of dual ported RAM 146 to Random Access Memory (RAM) 160. The addressing of RAM 160 is controlled in part by memory decoder 162, which decodes address and control values given by analyzer processor 36 along ADDRESS BUS 32 and CONTROL BUS 34. Decoder 162 can address memory locations in RAM 160 or Read-Only-Memory (ROM) 164 depending on the values on ADDRESS BUS 32 and CONTROL BUS 34.

Central processor 140 instructs analyzer processor 36 to execute one or more stored programs by storing a RUN command in dual-ported RAM 146 to cause dual-ported RAM 146 to issue an interrupt to analyzer processor 36. In response, analyzer processor 36 retrieves the command to be run from RAM 160 or ROM 164 and executes it.

Occasionally, analyzer processor 36 sends anomalous data, representing anomalous waveforms, to central processor 140 through dual-ported RAM 146 by storing values in dual-ported RAM 146. By storing a value in a particular memory location, analyzer processor 36 causes dual-ported RAM 146 to is:sue an interrupt to central processor 140 along INTERRUPT-CP 148. Upon receiving the interrupt, central processor 140 downloads the data.

In preferred embodiments, central processor 140 and display controller 110 are part of an independently operable computer 150. Computer 150 has a user interference 142 in the form of a keyboard or mouse, and other peripherals 144, such as hard and soft disc drives, compact disc drives, speakers, and connections to other computers. Computer 150 also has a Random Access Memory (RAM) and Read-Only Memory (ROM) (not shown). Central processor 140 accesses these devices through DATA BUS 130, ADDRESS BUS 132 and CONTROL BUS 134.

Computer 150 is preferably a common personal computer capable of executing standard personal computer software such as spread sheets, word processing programs, electronic mail, billing systems, and schedules. In addition, computer 150 can execute software related to the diagnosis and repair of combustion engines. Specifically, computer 150 can search and display parts lists, ideal ignition signals, non-ideal ignition signals, repair procedures, and expected repair costs. Computer 150 can also access a distributor's computer order system, as well as client information and vehicle history, located on remote computer systems. In addition, computer 150 can execute engine analyzer programs to display and highlight anomalous waveforms, histographs and average values.

As will be described below, the separation of computer 150 and rasterizer 96 allows for a digital representation of engine signals to be displayed in real time over a complex and changing background created by computer 150. This means that for all desired engine speeds the present invention will display a digital representation of the engine signal which is an accurate representation over all time while not interfering with computer 150's normal operation.

Figure 3:
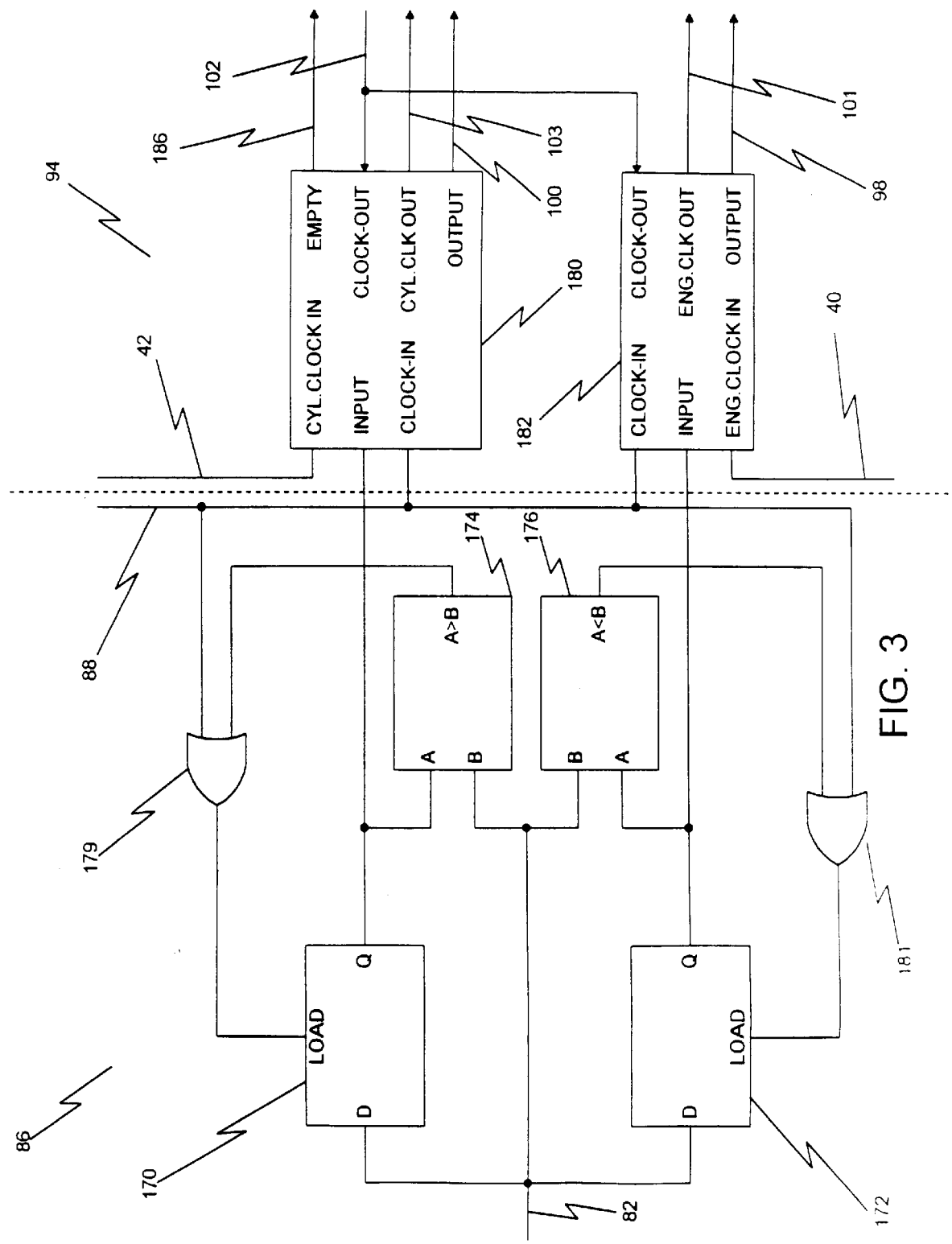
FIG. 3 is a block diagram of sampler 86 and FIFO 94 of FIG. 2.

FIG. 3 is a block diagram of sampler 86 and digital memory 94 of FIG. 2. DIGITAL A/B 82, carried on an eight-bit bus, is input to the D-inputs of D-flip flop 170 and D-flip flop 172. D-flip flop 170 and D-flip flop 172 are eight-bit latches with eight-bit parallel inputs and outputs. DIGITAL A/B 82 is also input to digital comparator 174 and digital comparator 176. Digital comparators 174 and 176 each have two inputs, A and B, that accept eight-bit digital values on eight-bit buses. Comparator 174 has a one-bit output that is high when the digital value at input A is greater than the digital value at input B, and otherwise is low. Comparator 176 has a one-bit output that is high when the digital value at its A input is less than the digital value at its B input.

The A input of comparator 174 is connected to the Q output of D-flip-flop 170. In operation, comparator 174 produces a high output when the value of DIGITAL A/B 82 at the B input of comparator 174 is less than the value of the Q output of D-flip-flop 170 at the A input of comparator 174. The output of comparator 174 is coupled to one input of OR-gate 179 whose output is connected to the LOAD input of D-flip-flop 170. When the output of comparator 174 becomes high, the high value at the LOAD input causes the current value of DIGITAL A/B 82 to be loaded into D-flip-flop 170. The comparator output returns to low once the current value loaded into D-flip-flop 170 appears at D-flip-flop 170's Q output. In this manner, D-flip-flop 170 and comparator 174 works together to capture the minimum value in DIGITAL A/B 82. Each time the current value in DIGITAL A/B 82 is less than the value stored in D-flip-flop 170, the current value over-writes the stored value to become the new stored minimum in D-flip-flop 170.

Comparator 176, D-flip-flop 172, and OR-gate 181 operate in a similar manner except that the output of D-flip-flop 172 stores the maximum value of DIGITAL A/B 82. Each time the value on DIGITAL A/B 82 is greater than the value at the Q output of D-flip-flop 172, the output of comparator 176 becomes high, causing OR-gate 181 to set the LOAD input of D-flip-flop 172 high. When D-flip-flop 172's LOAD input goes high, the current value of DIGITAL A/B 82 is stored as the new maximum in D-flip-flop 172.

Both D-flip-flop 170 and D-flip-flop 172 are reset at periodic intervals determined by DISPLAY SAMPLE CLOCK 88 from timing circuit 56. DISPLAY SAMPLE CLOCK 88 is input to OR-gates 179 and 181 which also receive the outputs of comparators 174 and 176 respectively. When DISPLAY SAMPLE CLOCK 88 becomes high, the output of OR-gates 179 and 181 are se, high causing D-flip-flops 170 and 172 to both load the current value of DIGITAL A/B 82, regardless of the values previously stored in the flip-flops.

The outputs from D-flip-flop 170 and D-flip-flop 172 are connected to the inputs of min First-In-First-Out (FIFO) 180 and max FIFO 182, respectively. Min FIFO 180 and max FIFO 182 together constitute digital memory 94 of FIG. 2. Min FIFO 180 and max FIFO 182 are first-in-first-out memory devices capable of storing several memory values at once. The first values stored in min FIFO 180 and max FIFO 182 are the first values recovered from min FIFO 180 and max FIFO 182. Values are loaded into min FIFO 180 and max FIFO 182 when DISPLAY SAMPLE CLOCK 88, the signal at min FIFO 180 and max FIFO 182's clock-in inputs, goes through a positive transition. Min FIFO 180 stores the eight-bit minimum value at the output of D-flip-flop 170 along with the one-bit value of CYLINDER CLOCK 42 from conditioner 38 of FIG. 2. Max FIFO 182 stores the eight-bit maximum value at the output of D-flip-flop 172 and the one-bit value of ENGINE CLOCK 40 from conditioner 38.

Nine-bit values are recovered from the FIFO's when there is a negative going transition in signal F-READ 102. F-READ 102 is created by rasterizer 96 and is received at the clock-out inputs of min FIFO 180 and max FIFO 182. The least significant eight bits released by min FIFO 180 are released as DELAYED LOW 100, and represent a minimum value in the engine signal during a sampling period. The least significant eight bits released by max FIFO 182 are released as DELAYED HIGH 98, and represent a maximum value in the engine signal during a sampling period. The ninth bit released by min FIFO 180 is POST-FIFO CYLINDER CLOCK 103, which represents a sample of CYLINDER CLOCK 42 at the time the associated eight-bit minimum was stored in min FIFO 180. The ninth bit released by max FIFO 182 is POST-FIFO ENGINE CLOCK 101 and represents a sample of ENGINE CLOCK 40 at the time the eight-bit associated maximum value was stored in max FIFO 182.

Min FIFO 180 also produces EMPTY signal 186 which has a high value when there are no values stored in min FIFO 180 and a low value when there is at least one value stored in min FIFO 180. EMPTY signal 186 is carried to rasterizer 96 on a one-bit line that is not shown in FIG. 2 for simplicity.

Figure 4:
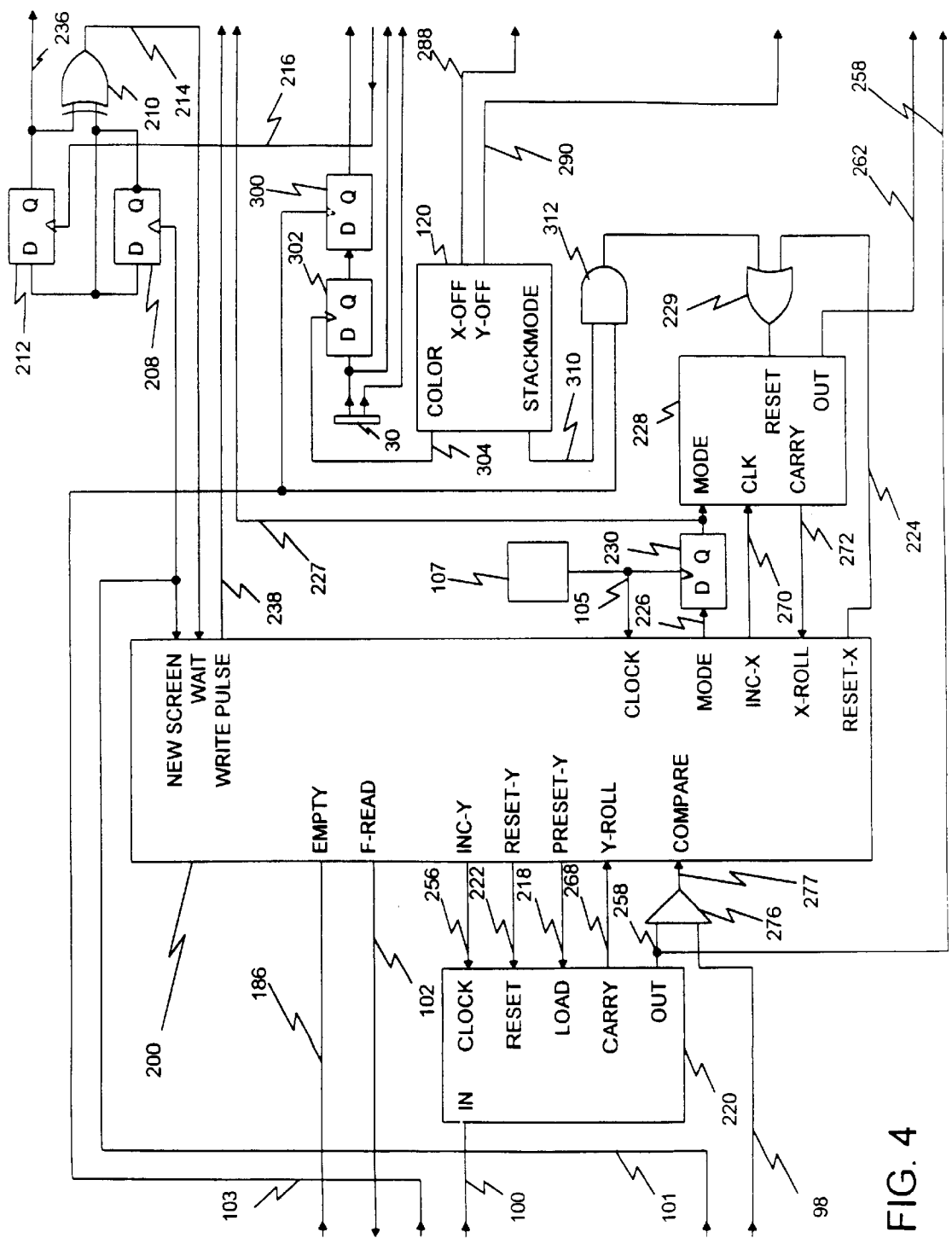
FIG. 4 is a block diagram of a portion of rasterizer 96 of FIG. 2.
Figure 5:
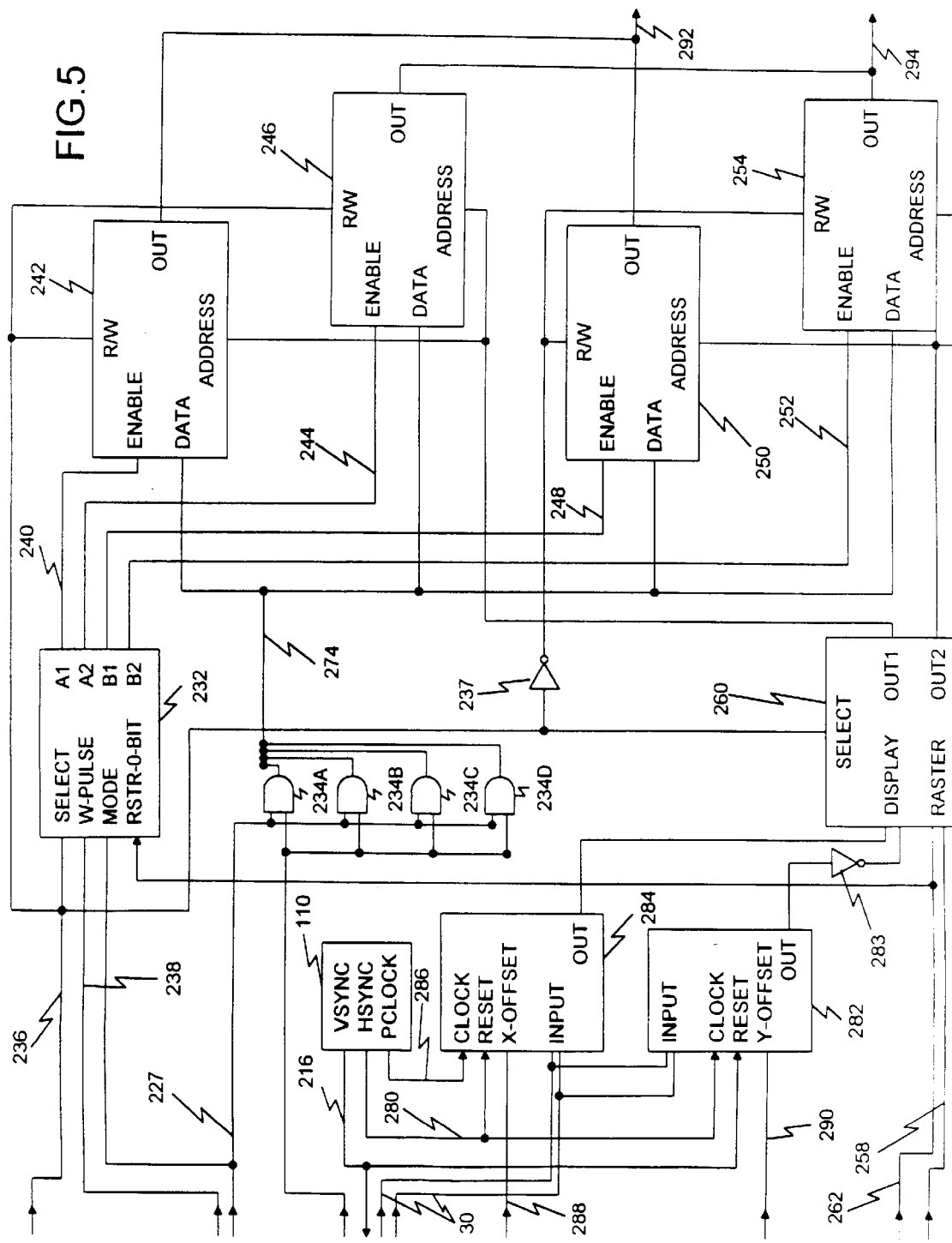
FIG. 5 is a block diagram of a second portion of rasterizer 96 of FIG. 2.

FIGS. 4, 5, and 6 are each block diagrams of separate portions of rasterizer 96 of FIG. 2. The operation of rasterizer 96 is largely controlled by stale machine 200, which has a plurality of inputs to monitor the current state of rasterizer 96 and a plurality of outputs to control rasterizer 96. State machine 200 cycles through a series of states, changing states based upon the values at its various inputs. At each new state, state machine 200 changes the values of some of its outputs. The rate at which state machine 200 operates is dependant upon CLOCK signal 105, which is received at state machine 200's clock input from independent clock 107 of FIGS. 2 and 4.

Figure 7:
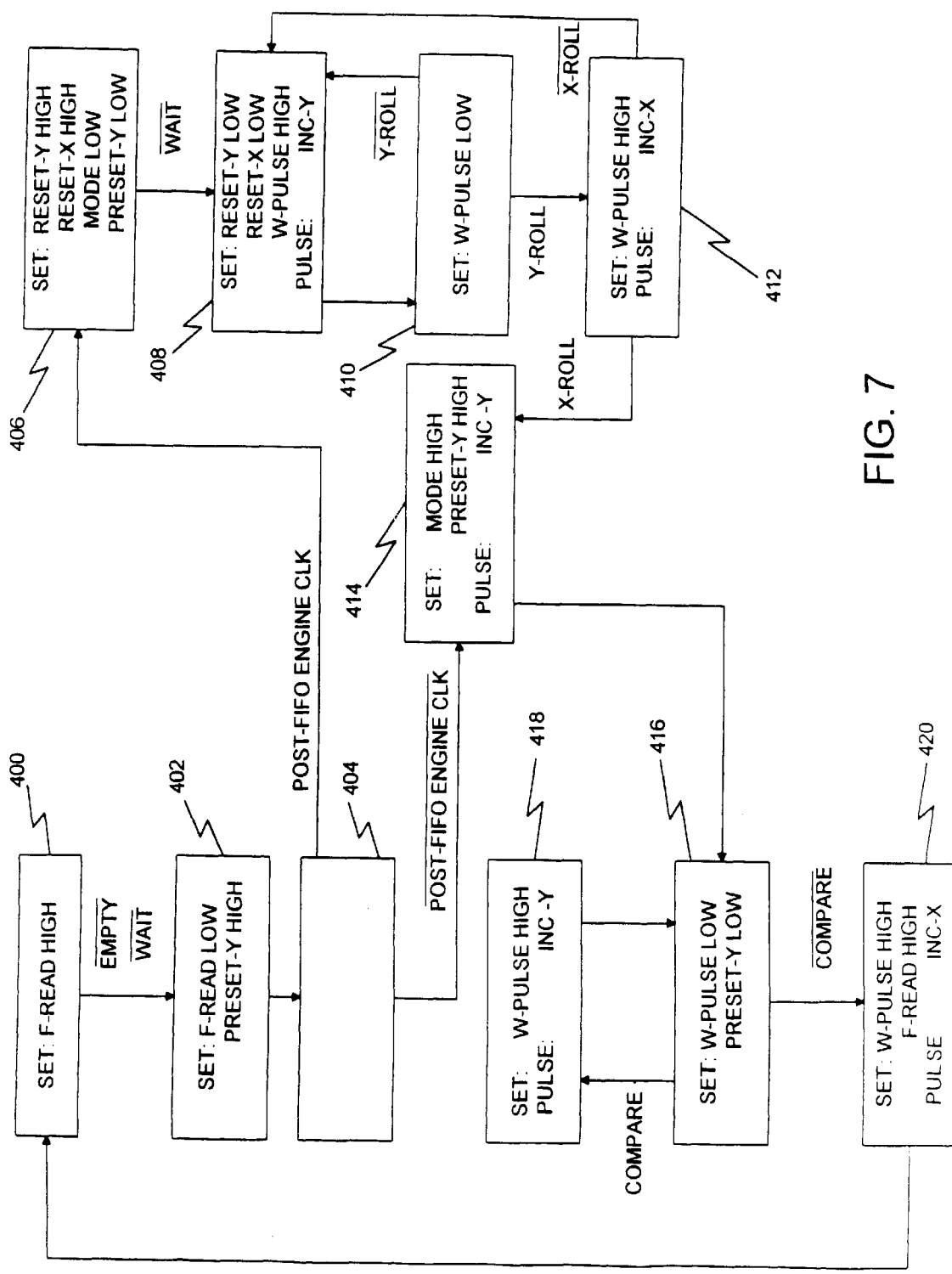
FIG. 7 is a state diagram of the series of states that state machine 200 of FIG. 4 occupies.

FIG. 7 is a diagram of all the states which state machine 200 occupies. The input signals which cause a transition from one state to the next are shown next to the transition arrows representing the respective transitions. Signals with lines over them indicate a low signal and signals without a line over them indicate a high value. The output signals that change at a given state are listed within the boxes of each state.

State machine 200 begins operation in state 400 as indicated in FIG. 7. In this state, state machine 200 has set F-READ 102 high in preparation for requesting values from min FIFO 180 and max FIFO 182 of FIG. 3. State machine 200 remains in this state until EMPTY 186 from min FIFO 180 is low, indicating that a value is stored in the FIFO, and WAIT signal 214 from exclusive-OR-gate 210 is low, indicating that display controller 110 and the values in the FIFO's are properly synchronized.

Wait signal 214 is an indicator of synchronization between display controller 110 and the values in the FIFO's because it is constructed from a digital combination of POST-FIFO ENGINE CLOCK 101 and VSYNC signal 216. POST-FIFO ENGINE CLOCK 101 is a binary signal that is low except when the values at the outputs of min FIFO 180 and max FIFO 182 correspond to the beginning of an engine cycle. VSYNC signal 216 is one of the binary SYNCHRONIZATION signals 108 from display controller 110 and is low except at the beginning of a new screen on display 112 of FIG. 2. Thus, when both POST-FIFO ENGINE CLOCK 101 and VSYNC signal 216 are high, the values at the outputs of min FIFO 180 and max FIFO 182 correspond to the beginning of an engine cycle and display 112 is at the beginning of a new screen. When this occurs, the stored values are said to be synchronized with the display.

Synchronization is desirable because it keeps rasterizer 96 from storing engine data representing a new engine cycle until the display is finished displaying an earlier engine cycle. As discussed below, rasterizer 96 has two separate sets of memory locations that each represent one display screen of data. While rasterizer 96 is writing to one set of memory locations, it is reading from the other set of memory locations. Before storing data for a new engine cycle, rasterizer 96 switches the two sets of memory locations so that it begins to read from the set of memory locations to which it had been writing, and begins to write to the set of memory locations from which it had been reading. WAIT signal 214 does not allow rasterizer 96 to switch the two sets of memory if rasterizer 96 is in the middle of reading a set of memory locations. This ensures that the display will always produce a full image of what is stored in the memory locations of rasterizer 96.

POST-FIFO ENGINE CLOCK 101 and VSYNC signal 216 produce WAIT signal 214 through D-flip-flop 208, D-flip-flop 212 and exclusive-OR-gate 210. D-flip-flop 208 is configured as a toggle with POST-FIFO ENGINE CLOCK 101 as its clock signal, and its inverse output $\overline{Q}$ coupled to its input D. In this configuration, D-flip-flop 208 captures each positive going transition in POST-FIFO ENGINE CLOCK 101 by toggling states. D-flip-flop 212 operates as a latch that latches the current state of D-flip-flop 208 with each positive going transition in VSYNC signal 216, which is received at the clock input of D-flip-flop 208. (VSYNC signal 216 originates from display controller 110, which is shown in FIG. 5). The inverse output $\overline{Q}$ of D-flip-flop 208 and the output Q of D-flip-flop 212 are both input to exclusive-OR-gate 210, which produces WAIT signal 214.

In operation, VSYNC signal 216 typically has several positive going transitions between successive positive going transitions in POST-FIFO ENGINE CLOCK 101. Thus, most of the time, the Q output of D-flip-flop 212 matches the inverse output $\overline{Q}$ of D-flip-flop 208 and WAIT signal 214 is low. However, when there is a positive going transition in POST-FIFO ENGINE CLOCK 101, D-flip-flop 208 toggles states and the two inputs to exclusive-OR-gate 210 are different. This makes WAIT signal 214 high and indicates that the next output values of min FIFO 180 and max FIFO 182 correspond to the beginning of an engine cycle and that rasterizer 96 is not finished reading the current display data. Once the display is ready to produce a new screen, VSYNC signal 216 becomes high, and the new value of D-flip-flop 208 is latched to the output Q of D-flip-flop 212. This makes both inputs to exclusive-OR-gate 210 equal and causes WAIT signal 210 to return low, where it remains until the next positive going transition in POST-FIFO ENGINE CLOCK 101.

When EMPTY signal 186 is low, indicating values are stored in min FIFO 180 and max FIFO 182, and WAIT signal 214 is low, indicating synchronization between the display and the outputs of min FIFO 180 and max FIFO 182, state machine 200 changes states to state 402. In state 402, state machine 200 sets F-READ 102 low and PRESET-Y signal 218 high. When F-READ 102 goes low it causes min FIFO 180 and max FIFO 182 of FIG. 3 to output new values for DELAYED LOW 100 and DELAYED HIGH 98 respectively.

DELAYED LOW 100 is received at the eight-bit input port of y-counter 220. PRESET-Y signal 218 controls the load input of y-counter 220 so that with PRESET-Y signal 218 high, the value of DELAYED LOW 100 is loaded into y-counter 220. The loading of y-counter 220 from min FIFO 180 takes a period of time. During that time, state machine 200 changes from state 402 to state 404, as shown in FIG. 7.

State 404 is a decision state from which state machine 200 may move either to state 406 or state 414. State machine 200 will move to state 406 if POST-FIFO ENGINE CLOCK 101 is high, indicating that the digital representation of a new engine signal is to be converted into a display format. If POST-FIFO ENGINE CLOCK 101 is low, state machine 200 enters state 414.

State 406 is the beginning of a loop used to clear a set of memory locations before writing new values to memory. The loop consists of states 406, 408, 410, and 412. In state 406, state machine 200 sets PRESET-Y signal 218 low, RESET-Y signal 222 high, RESET-X signal 224 high and MODE signal 226 low. RESET-Y signal 222 travels from state machine 200 to the reset input of y-counter 220. When RESET-Y signal 222 goes high with PRESET-Y signal 218 low, the output count of y-counter 220, Y-COUNT 258, is set to zero. Similarly RESET-X signal 224 travels from state machine 200 to x-counter 228 through OR-gate 229. When RESET-X signal 224 becomes high it causes the output count of x-counter 228, X-COUNT 262, to be set to zero. Since y-counter 220 and x-counter 228 are used to address memory locations where pixel values are stored, resetting the counters ensures that the process of resetting the memory locations assigned to one display screen will begin at the first memory location.

MODE signal 226 originates at state machine 200 and is received at the D-input of latch 230. Latch 230 is clocked by CLOCK signal 105 from independent clock 107. At the first positive transition in CLOCK signal 105, latch 230 passes the low value of MODE signal 226 to its output to produce LATCHED MODE 227. The output of latch 230 is coupled to the mode input of x-counter 228 of FIG. 4, the mode input of chip select 232 and one input of each of AND-gates 234A, 234B, 234C, and 234D of FIG. 5. LATCHED MODE 227 indicates whether state machine 200 is in the loop of states used to clear the memory locations. When it is low, state machine 200 is in the clearing loop; when it is high, state machine 200 is not in the clearing loop.

When the mode input of x-counter 228 goes low it causes x-counter 228 to count by adding one to the second least significant bit rather than the least significant bit. This halves the time needed to count from zero to a maximum count.

Chip select 232 of FIG. 5 is used to enable one or more memory chips. In addition to receiving LATCHED MODE 227, chip select 232 receives SELECT signal 236, which is the Q output from latch 212 of FIG. 4. SELECT signal 236 is received at the select input to chip select 232, and changes values each time rasterizer 96 swaps the sets of memory locations into which it writes and reads engine waveform data.

Chip select 232 uses LATCHED MODE 227 and SELECT signal 236 along with two other signals to determine which of four memory chips it should enable. The four memory chips are shown in FIG. 5 and are divided into two pairs: memory chips A1 242 and A2 246 form the first pair, and memory chips B1 250 and B2 254 form the second pair. Chip select 232 uses separate enable/disable lines to enable and disable the memory chips. Specifically, A1-ENABLE 240, A2-ENABLE 244, B1-ENABLE 248, and B2-ENABLE 252 enable and disable chips A1 242, A2 246, B1 250, and B2 254, respectively.

Chip select 232 uses SELECT signal 236 to enable one pair of memory chips in the read mode, which allows values to be read from the memory locations of those chips. When SELECT signal 236 is high, memory chips A1 242 and A2 246 are enabled in the read mode and when SELECT signal 236 is low, memory chips B1 250 and B2 254 are enabled in the read mode. Chip select 232 uses its other inputs, MODE, WRITE PULSE, and RASTER-0-BIT to selectively enable the memory chips that it did not enable in response to SELECT signal 236. For instance, in response to a high value on SELECT signal 236, chip select 232 indiscriminately enables memory chips A1 242 and A2 246 in the read mode and selectively enables memory chips B1 250 and B2 250 based on the values at the MODE, WRITE PULSE, and RASTER-0-BIT inputs. In particular, when the values at the MODE and WRITE PULSE inputs of chip select 232 are low, chip select 232 enables all four memory chips. This occurs while the values at the memory locations of one pair of memory chips are being reset to zero. When the MODE input is high, chip select 232 enables three chips, two on the basis of SELECT signal 236 and one on the basis of the value at the RASTER-0-BIT input. The memory chip that is selectively enabled in this manner is only enabled while the value at the WRITE PULSE input is low. This combination of inputs occurs when values are being read from one pair of memory chips and, at the same time, a value is being stored in a memory location of a third memory chip.

In addition to being connected to the SELECT input of chip select 232, SELECT signal 236 is also connected to memory chips A1 242 and A2 246 at their respective read/write inputs. The read/write inputs of memory chips A1 242 arid A2 246 determine whether these memory chips are in a read or a write mode. When SELECT signal 236 is high, memory chips A1 242 and A2 246 are in the read mode. As discussed above, when SELECT signal 236 is high at the select input of chip select 232, memory chips A1 242 and A2 246 are indiscriminately enabled. Thus, the effect of having SELECT signal 236 high causes memory chips A1 242 and A2 246 to be enabled in a mode where values may be retrieved from their memory.

Similarly, SELECT signal 236 is inverted by inverter 237 and the inverted signal is applied to the read/write inputs of memory chips B1 250 and B2 254. Thus, when SELECT signal 236 is high, memory chips B1 250 and B2 254 are in the write mode and are capable of receiving values at their memory locations once they are enabled.

When SELECT signal 236 is low, memory chips B1 250 and B2 254 are indiscriminately enabled in the read mode while memory chips A1 242 and A2 246 are selectively enabled in the write mode.

As stated above, when state machine 200 is in state 406 it sets MODE signal 226 low. That low value propagates through latch 230 as LATCHED MODE 227, which is input to chip select 232. The low value of LATCHED MODE, 227 causes chip select 232 to enable two memory chips in the write mode as soon as the value at chip select 232's WRITE PULSE input goes low. Chip select 232's WRITE PULSE input receives WRITE PULSE signal 238 from the WRIT PULSE output of state machine 200, so that state machine 200 controls when values are written to the two enabled memory chips.

LATCHED MODE 227 is also received at one of the inputs of each of AND-gate:; 234A, 234B, 234C, and 234D of FIG. 5. The outputs from AND-gates 234A, 234B. 234C and 234D are connected as separate bits to the four-bit data inputs of each of the four memory chips. When LATCHED MODE 227 goes low, the data inputs of each of the memory chips are set to zero regardless of the values at the other inputs of AND-gates 234A, 234B, 234C, and 234D.

With WAIT signal 214 low, machine 200 changes state to state 408. In state 408, state machine 200 sets RESET-Y signal 222 and RESET-X signal 224 low. Setting RESET-Y signal 222 and RESET-X signal 224 low allows y-counter 220 and x-counter 228 respectively, to begin counting on their next respective clock transitions. State machine 200 then places a pulse on INCREMENT-Y signal 256 which is input to the clock input of y-counter 220. This causes y-counter 220 to increment by 1.

Y-COUNT 258 is the eight-bit output count from y-counter 220. Y-COUNT 258 is input as the most significant 8 bits of the RASTER input of multiplexer 260 of FIG. 5. X-COUNT 262 is the nine-bit output of x-counter 228. The eight most significant bits of X-COUNT 262 are provided as the least significant eight bits of the RASTER input of multiplexer 260. The least significant bit of X-COUNT 262 is received by the RASTER-0-INPUT of chip select 232.

The select input of multiplexer 260 receives SELECT signal 236, which causes the signal received at the RASTER input of multiplexer 260 to be output to the memory chips enabled in the write mode. The values at the RASTER input are output along one of two sixteen bit address buses, which are coupled to the address inputs of the memory chips. Since the value at the RASTER inputs is a combination of the counts from y-counter 220 and x-counter 228, these counters act as an addressing circuit to address the memory locations enabled to receive values.

State machine 200 changes from state 408 to state 410, as shown in FIG. 7, after incrementing the count of y-counter 220. In state 410, state machine 200 sets WRITE PULSE signal 238 low. This causes a value of zero to be written to the address described by the combination of X-COUNT 262 and Y-COUNT 258. Since LATCHED MODE 227 is low in state 410, the values from AND-gates 234A, 234B, 234C, and 234D are low. In addition, the low value of LATCHED MODE 227 causes chip select 232 to enable two memory chips in the write mode. This causes a zero to be written to a memory location in two different memory chips.

Y-counter 220 has a carry output producing Y-ROLL signal 268. Y-ROLL signal 268 is high when y-counter 220 has counted one past its maximum count. If y-counter 220 has not reached its maximum count when state machine 200 is in state 410, as judged by the value of Y-ROLL signal 268, state machine 200 returns to state 408. It resets WRITE PULSE signal 238 to high and increments y-counter 220 by sending a pulse on INCREMENT-Y signal 256. State machine 200 then returns to state 410 where WRITE PULSE signal 238 is again set to low, causing chip select 232 to enable two chips in the write mode and storing values of zero in two new memory locations. State machine 200 will continue to loop through states 408 and 410 until y-counter 220 reaches its maximum count.

By looping between states 408 and 410, state machine 200 is able to place a value of zero at every memory location with the most significant eight bits of X-COUNT 262 as its least significant eight bits. Since LATCHED MODE 227 is low in states 408 and 410, zeros are placed in these memory locations in two separate memory chips.

If y-counter 220 has reached its maximum count when state machine 200 is in state 410, state machine 200 will change states to state 412. In state 412, state machine 200 sets WRITE PULSE signal 238 high and sends a pulse on INCREMENT-X signal 270. INCREMENT-X signal 270 is received by the clock input of x-counter 228, causing x-counter 228 to increment its count by two because the low signal at the MODE input of x-counter 228 causes x-counter 228 to increment the second least significant bit by one instead of the least significant bit. As discussed above, the MODE input of x-counter 228 remains low during the entire clearing loop represented by states 406, 408, 410 and 412 in FIG. 7.

X-counter 228 has a carry output which creates X-ROLL signal 272. When X-ROLL signal 272 is low, it indicates that x-counter 228 has not reached its maximum count. However, when X-ROLL signal 272 is high it indicates that the last increment of x-counter 228 caused it to count past its maximum count.

If x-counter 228 has not reached its maximum count when state machine 200 is in state 412, state machine 200 returns to state 408. The state machine then cycles through states 408 and 410 as described above; placing zeros in all of the locations which have the most significant eight bits of the new value in x-counter 228 as the least significant eight bits of their addresses. The state machine continues this cycle of changing between states 408, 410 and 412 until y-counter 220 has counted from zero to its maximum count at each counter value from zero to the maximum count of x-counter 228. As soon as x-counter 228 has passed its maximum count and X-ROLL signal 272 is high, state machine 200 changes states from state 412 to state 414. After leaving state 412, each memory location in the two memory chips in the write mode have had their values set to zero.

In state 414, state machine 200 sets MODE signal 226 high causing LATCHED MODE 227 and the MODE inputs of x-counter 228 and chip select 232 to go high on the next positive-going transition in CLOCK signal 105. This takes x counter 228 out of the mode of adding one to the next to least significant bit with each pulse on INCREMENT-X signal 270 and instead places it in the mode of adding one to the least significant bit with each pulse on INCREMENT-X signal 270. The change in LATCHED MODE 227 keeps chip select 232 from enabling both of the memory chips in the write mode when WRITE PULSE signal 238 goes low. Instead chip select 232 only enables one of the two memory chips that are in the write mode when WRITE PULSE signal 238 goes low. The memory chip that is enabled is determined by the least significant bit of X-COUNT 262, which is to received at the RASTER-0-BIT input of chip select 232.

In state 414, state machine 200 also sets PRESET-Y signal 218 high. This causes y-counter 220 to load the current value of DELAYED LOW 100 as its starting count. After the value is loaded, state machine 200 places a pulse on INCREMENT-Y signal 256 causing y-counter 220 to increment Y-COUNT 258 by one.

State machine 200 changes from state 414 to state 416, where state machine 200 sets WRITE PULSE signal 238 low causing chip select 232 to enable one of the two memory chips in the write mode. Which memory chip is selected is decided by the least significant bit in X-COUNT 262. Once the chip is enabled, a four-bit COLOR VALUE 274 passing through AND-gates 234A, 234B, 234C, and 234D as four individual bits, is loaded into the enabled chip at a memory location having an address equal to the combination of the most significant eight bits of X-COUNT 262 and all of the bits of Y-COUNT 258. COLOR VALUE 274 represents the color that the engine waveform will have when displayed.

COLOR VALUE 274 originates from analyzer processor 36 of FIG. 2. Latch 302 receives the four-bit color value from analyzer processor 36 along DATA BUS 30, which is shown in FIG. 4 as two four-bit buses. The four-bit values are latched into latch 302 in response to COLOR signal 304 from decoder 120, which produces COLOR signal 304 in response to decoded values on ADDRESS BUS 32 and CONTROL BUS 34 created by analyzer processor 36. (ADDRESS BUS 32 and CONTROL BUS 34 are not shown in FIG. 4 for simplicity). Changes in color are synchronized to the waveforms stored in min FIFO 180 and max FIFO 182 of FIG. 3 by latch 300, which receives the four-bit output of latch 302 and which is clocked by POST-FIFO CYLINDER CLOCK 103. This arrangement forces color changes to occur at the beginning of a new cylinder firing. Although this color synchronization is preferred, in other embodiments the color may be changed within a cylinder firing to highlight certain aspects of the engine waveform.

The four-bit output of latch 300 is separated into four one-bit lines, each of which is input to a respective input of AND-gates 324A, 324B, 324C, and 324D. Each AND-gate passes its respective one-bit portion of the color value to its respective output because each AND-gate's respective other input receives LATCHED MODE 227, which is high while values are being stored in memory. The four one-bit outputs of the AND-gates are combined and appear in FIG. 5 as a single four-bit line for simplicity.

After a color value is stored in the memory location of one of the memory chips, Y-COUNT 258 of FIG. 4 and DELAYED HIGH 98 from max FIFO 182 of FIG. 3 are compared by comparator 276. If Y-COUNT 258 is less than DELAYED HIGH 98, COMPARE signal 277 is high and state machine 200 changes from state 416 to state 418.

In state 418, state machine 200 resets WRITE PULSE signal 238 to high and pulses INCREMENT-Y signal 256, causing Y-COUNT 258 to increment by one.

After changing these values, state machine 200 returns to state 416, setting WRITE PULSE signal 238 low and causing four-bit COLOR VALUE 274 to be written to the new memory location as defined by the combination of Y-COUNT 258 and the most significant eight bits of X-COUNT 262. State machine 200 cycles between states 418 and 416 until Y-COUNT 258 is equal to DELAYED HIGH 98. Thus, for a given value of X-COUNT 262, rasterizer 96 stores a color value for every memory location from the minimum digital value found on DELAYED LOW 100 to the maximum digital value found on DELAYED HIGH 98. The values stored for a given X-COUNT 262 represent a vertical line on the display. Each vertical line begins at a position represented by DELAYED LOW 100 and continues upward to a position represented by DELAYED HIGH 98.

When Y-COUNT 258 is equal to DELAYED HIGH 98, COMPARE signal 277 is low and state machine 200 changes from state 416 to state 420. In state 420. state machine 200 sets WRITE PULSE signal 238 and F-READ 102 high. In addition, state machine 200 pulses INCREMENT-X signal 270, which causes X-COUNT 262 to increment its least significant bit by one. The change is detected at the RASTER-0-BIT input of chip select chip elect 232 and causes chip select 232 to disable the previously enabled write chip and to enable the previously disabled write chip. After performing these functions, state machine 200 returns to state 400.

The operation of the state machine is the same as described above, once it returns to state 400, except that when the state machine reaches state 404, POST-FIFO ENGINE CLOCK 101 will be low. This will cause state machine 200 to go directly from state 404 to state 414. Thus, state machine 200 only clears the memory locations when a new screen is to be written. From state 414, state machine 200 returns to state 416 and cycles through states 416 and 418 to store values representing a second vertical line based on a different pair of minimum and maximum digital values from DELAYED LOW 100 and DELAYED HIGH 98 respectively. State machine 200 continues to store values for vertical lines until there are no more digital values in min FIFO 180 and max FIFO 182 or until POST-FIFO ENGINE CLOCK 101 causes WAIT signal 214 to return high indicating the need to wait for a new trace on the display.

In one preferred embodiment, state machine 200 resets x-counter 228 to zero before POST-FIFO ENGINE CLOCK 101 indicates that a new trace should be stored and before EMPTY signal 186 indicates that there are no more values in min FIFO 180 and max FIFO 182. In this embodiment, different portions of ANALOG A 46 and ANALOG B 44 have different D.C. voltages added to them by conditioner 38 of FIG. 2. This results in D.C. offsets for the values stored in min FIFO 180 and max FIFO 182. These offsets can be used in this embodiment to display the different portions of a signal in a "stacked" format, where the different portions are aligned vertically on the display.

Analyzer processor 36 places the display in "stack" mode in response to an instruction received from central processor 140 through dual-ported RAM 146 of FIG. 2. Analyzer processor 36 instructs conditioner 38 to add the proper D.C. offsets to different portions of ANALOG A 46 and/or ANALOG B 44. Analyzer processor 36 also issues a command to timing circuit 56 to increase the number of samples taken from the engine signal. The increase in sampling is needed because each portion of the engine signal should provide enough samples to fill the entire width of the display area. For instance, if six portions of the engine signal will be stacked, approximately six times as many samples will be needed.

Analyzer processor 36 also controls the storing of the pixel values in the memory chips of rasterizer 96 so that the different portions of the engine signals will be displayed in a stacked format. This is accomplished by resetting x-counter 228 after each portion of the engine signal is stored in the memory chips. Analyzer processor 36 resets x-counter 228 through STACKMODE signal 310, which is one of the signals in CONTROLS 121 from decoder 120.

STACKMODE signal 310 is input to AND-gate 312, which also receives POST-FIFO CYLINDER CLOCK 103, producing a signal that is synchronized to the beginning of a cylinder firing in the samples released by min FIFO 180 and max FIFO 182. The output of AND-gate 312 is input to OR-gate 229 where a logical OR function is performed with RESET-X 224 from state machine 200. The output of OR-gate 229 is input to x-counter 228's reset input. Together, these circuit components create a signal that resets x-counter 228 at the beginning of each cylinder firing while STACKMODE signal 310 is high.

By adjusting the D.C. offset and periodically resetting x-counter 228, analyzer processor 36 assigns portions of the engine signal to respective blocks of memory locations in the memory chips. For example, a first cylinder firing may be assigned memory locations addressed by X values of 0 to 512 and Y values of 0 to 50, and a second cylinder firing may be assigned to memory locations addressed by X values between 0 and 512 and Y values between 51 and 100.

While rasterizer 96 has been described in terms of state machine 200, those skilled in the art will recognize that the functions of state machine 200 may be performed by a high-speed microprocessor. However, such a microprocessor would involve at least 200 times as many logic components as the state machine. In addition, while only four memory blocks have been described, those skilled in the art will recognize that using more memory blocks decreases the time needed to clear the memory using the method of the present invention.

While rasterizer 96 is writing to the two memory chips in the write mode, it is also accessing the memory locations of two memory chips in the read mode. Display controller 110 controls the rate and order in which values are retrieved from the two memory chips through SYNCHRONIZATION signals 108 which include VSYNC 216, HSYNC 280, and PCLOCK 286 as shown in FIG. 5.

To begin accessing the memory, display controller 110 sets VSYNC 216 and HSYNC 280 high. A high value for VSYNC 216 resets y-counter 282 of FIG. 5 to zero, and a high value for HSYNC 180 resets x-counter 284 of FIG. 5 to zero.

The eight-bit output of y-counter 282 is input to digital inverter 283 which creates a 1's-compliment of the output of y-counter 282. The 1's-compliment of the output of y-counter 282 and the eight-bit output of x-counter 284 are combined at the DISPLAY inputs of multiplexer 260, which directs the combination of counts to the address buses of the pair of memory chips in the read mode. The sixteen-bit combination of the 1's-compliment of the output of y-counter 282 and the output of x-counter 284 defines a memory location on both memory chips that are in the read mode.

The 1's-compliment of y-counter 282 must be created because the values in the memory chips were stored so that pixels for the lower part of the screen are stored in memory locations with addresses that have small digital values, and pixels for the upper part of the screen are stored in memory locations with addresses that have larger digital values. Since the display expects to receive rows of pixels, beginning in the upper left corner of the display and descending down to the lower right corner, the count from y-counter 282 must be inverted so that the read begins at the row of memory locations addressed by the highest y-count and ends at the row of memory locations with the lowest y-count.

Rasterizer 96 reads values from each memory location found in the memory chips that are read enabled. The values are read out two at a time, at the frequency of PCLOCK 286. PCLOCK 286 is connected to the clock input of x-counter 284 and causes x-counter 284 to increment by one with each clock pulse. In addition, at periodic clock intervals, display controller 110 pulses HSYNC 280 causing x-counter 284 to reset. The pulse on HSYNC 280 is also connected to the clock input of y-counter 282. This causes y-counter 282 to increment by one each time there is a pulse on HSYNC 280. Thus, x-counter 284 counts from zero to a set count for each increment of y-counter 282. After a set number of pulses have been sent on HSYNC 280, display controller 110 sends a pulse on VSYNC 216. This causes y-counter 282 to reset at the same time as x-counter 284.

Analyzer processor 36 controls where the retrieved data values appear on the display screen through X-OFFSET signal 288 and Y-OFFSET signal 290. X-OFFSET signal 288 and Y-OFFSET signal 290 are part of CONTROLS 121 from decoder 120 as shown in FIG. 4. X-OFFSET signal 288 and Y-OFFSET signal 290 instruct x-counter 284 and y-counter 282, respectively, to load a value at their inputs and to delay counting for a number of clock cycles equal to that value. The value at the inputs of the two counters is provided on DATA BUS 30 from analyzer processor 36. By delaying when y-counter 282 and x-counter 284 begin to count, analyzer processor 36 is able to control when the display receives the data values from rasterizer 96. This delay shifts where the retrieved values appear on the display.

Since both chips in the read mode are enabled, the sixteen-bit address defined by the combination of y-counter 282 and x-counter 284 accesses memory values in two separate memory chips. The first memory chip outputs a four-bit value on first output line 292 and the second memory chip outputs a four-bit value on second output line 294. The values on first output line 292 and second output line 294 are not necessarily equal.

FIG. 6 is a digital block diagram of a final stage of rasterizer 96, mixer 114 and displays 112 of FIG. 2. First output line 292 and second output line 294 of FIG. 5 are input to dual-input eight-bit latch 296. The clock input of eight-bit latch 296 receives PCLOCK 286 from display control 110. PCLOCK 286 is the same clock signal used to access values from the memory chips of rasterizer 96. With every positive transition in PCLOCK 286, eight-bit latch 296 stores the four-bit value on first output line 292 and the four-bit value on second output line 294 into its memory. During the steady state high portion of PCLOCK 286, eight-bit latch 296 outputs the value from first output line 292 on four-bit line 298. During the steady state low portion of PCLOCK 286, eight-bit latch 296 outputs the value from second output line 294 on four-bit line 298.

Four-bit line 298 is connected to the input of four-bit latch 330 which has its clock input connected to PCLOCK 286. Four-bit latch 330 latches in a new value with each transition, both positive and negative, of PCLOCK 286. Four-bit latch 330 produces RASTER 104 which is input to mixer 114.

In addition to RASTER 104, mixer 114 also receives DISPLAY signal 118 and PCLOCK 286 from display controller 110. In one preferred embodiment, mixer 114 combines DISPLAY signal 118 and RASTER 104 on a pixel by pixel basis. Each four-bit value on RASTER 104 is checked to determine if it is equal to zero. If it is equal to zero, the current value on DISPLAY signal 118 is passed to the output as COLOR LOOK-UP 332. If the value of RASTER 104 is not zero, that non-zero value is passed to the output as COLOR LOOK-UP 332.

COLOR LOOK-UP 332 is input to pallet 334 which uses COLOR LOOK-UP 332 to determine a color value from a color look-up table. Pallet 334 converts the value of COLOR LOOK-UP 332 to a DISPLAY COLOR 122 which display 112 translates to a visual color.

In addition to receiving DISPLAY COLOR 122, display 112 also receives SYNCHRONIZATION signals 108 from display controller 110. SYNCHRONIZATION signals 108 include PCLOCK 286, HSYNC 280 and VSYNC 216. Display .112 uses SYNCHRONIZATION signals 108 and DISPLAY COLOR 122 to create a display by directing streams of electrons at a phosphor coated display screen.

The present invention allows for real-time digital display of electrical engine analyzer signals on a personal computer while allowing the personal computer to execute other software that is not necessarily related to engine analysis. Because the state machine controls most of the rasterizing functions, central processor 140 of the separately operable computer can be used in a typical fashion common to any stand alone personal computer. The computational load on central processor 140 does not affect the current system's ability to present a real-time digital image of an engine signal.

Although the present invention has been described with reference to preferred embodiments, workers skilled in the art will recognize that changes may be made in form and detail without departing from the spirit and scope of the invention.

What is claimed is:

1. A motorized-vehicle information system for accessing and manipulating information relating to motorized vehicles, the information system comprising:

a computer, comprising a user input interface capable of receiving instructions and values from a user, a microprocessor, coupled to the user input interface, the microprocessor for executing instructions and for creating a first video signal, and an output interface coupled to the microprocessor, the output interface capable of receiving the first video signal and of providing a perceivable output to a user; and a monitoring system, coupled to a motorized vehicle and the computer, the monitoring system comprising a data acquisition system for monitoring attributes of the motorized vehicle and for providing attribute signals to a version of a monitored attribute, and a video waveform generation system for converting the attribute signals into a second video signal representing a waveform, the second video signal capable of appearing in combination with the first video signal as a real-time perceivable output at the computer's output interface.

2. The information system of claim 1 wherein the attribute signal capable of appearing as a real-time perceivable output at the computer's output interface is a sampled version of an electrical signal from a combustion engine in the motorized vehicle.

3. The information system of claim 1 wherein the computer further comprises peripheral devices storing motorized vehicle information.

4. The information system of claim 3 wherein the peripheral devices store ideal attribute signals.

5. The information system of claim 3 wherein the peripheral devices store non-ideal attribute signals.

6. The information system of claim 3 wherein the peripheral devices store parts lists.

7. The information system of claim 1 wherein the computer is capable of executing a billing program for generating invoices.

8. The information system of claim 1 wherein the computer is capable of executing a repair costs program for estimating repair costs.

9. The information system of claim 1 wherein the computer is capable of executing a repair procedures program for displaying instructions for repair the motorized vehicle.

10. The information system of claim 1 wherein the computer is capable of executing an electronic mail program for communicating with other users on remote computer systems.

11. The information system of claim 1 wherein the computer is capable of executing a schedule program for scheduling and recording repair and diagnosis time.

12. The information system of claim 1 wherein the computer is capable of executing a program completely unrelated to the analysis or display of the monitored attributes of the vehicle.

13. The information system of claim 1 wherein the computer issues commands to the monitoring system to control the monitoring of the vehicle's attributes.

14. The information system of claim 13 wherein the computer is capable of executing a diagnosis program that causes the computer to issue commands to the monitoring system to monitor specific attributes at specific times.

15. The information system of claim 1 wherein the monitoring system further comprises a feature extractor for locating abnormal values of a monitored attribute.

16. The information system of claim 15 wherein the feature extractor transmits abnormal values to the computer.

17. The information system of claim 16 wherein the computer issues commands to the monitoring system to control which classes of abnormal values are transmitted to the computer by the feature extractor.

18. The information system of claim 2 wherein the monitoring system is capable of providing a sampled version of a single cycle of an attribute to the computer separate from the monitoring system's production of the attribute signal capable of appearing as a real-time perceivable output at the computer's output interface.

19. The information system of claim 1 wherein an attribute signal from the monitoring system is synchronized to the computer's output interface through synchronization signals from the computer.

20. The information system of claim 1 wherein the monitoring system further comprises a display memory for storing samples of an attribute signal before providing them to the computer.

21. The information system of claim 20 wherein the display memory is divided into at least two groups of memory locations, each group's memory location's together representing all of the pixels of one video representation of an attribute signal, and at least one group providing samples to the computer while at least one other group is accepting samples from another portion of the monitoring system.

22. The information system of claim 20 wherein the display memory is divided into a,. least two parallel sections, the at least two parallel sections together having memory locations representing all of the pixels of one video representation of an attribute signal, the memory locations in each parallel section being addressable by memory addresses, at least one memory address common to a memory location in each parallel section.

23. The information system of claim 22 wherein the display memory is reset by addressing memory locations in both parallel sections simultaneously using identical sets of addresses for both parallel sections.

24. The information system of claim 23 wherein at least two digital values are retrieved simultaneously using one memory address.

25. The information system of claim 24 wherein the simultaneously retrieved digital values are later separated in time.

26. The information system of claim 1 wherein a monitor system attribute signal is combined with a digital video signal from the computer to produce a video output at the computer's output interface.

27. The information system of claim 1 wherein the monitoring system further comprises a storage controller for storing values in a memory, and a production controller for reading values from the memory to produce an attribute signal for the computer, the storage controller comprising two conversion counters, each conversion counter incrementing its count during the process of storing values in the memory to produce a series of memory addresses for addressing memory locations in the memory, the production controller comprising two production counters and an inverter, each production counter incrementing its count during the process of accessing digital values from the memory locations, one of the production counters producing a non-inverted count and the other production counter producing a count that is inverted by the inverter to produce an inverted count, the inverted count and the non-inverted count for addressing the memory locations.

28. A motorized-vehicle diagnostic tool comprising:
   a motorized-vehicle analyzer, coupled to a motorized vehicle, for measuring at least one condition of the motorized vehicle, the analyzer capable of producing at least one analyzer signal representative of a condition of the motorized vehicle;
   a video waveform generation device, coupled to the motorized vehicle analyzer, the video waveform generation device capable of converting, an analyzer signal into a video signal representing a waveform, the video signal capable of appearing as a real-time perceivable output; and
   a computing device, coupled to the motorized vehicle analyzer and the video waveform generation device, the computing device capable of operating on a stored set of instructions and useful independently of the motorized-vehicle analyzer, the computing device capable of producing at least one computing signal and of receiving at least one video signal from the video waveform generation device, the computing device further capable of producing a real-time perceivable output overlaid by the video signal from the video waveform generation device.

29. The motorized-vehicle diagnostic tool of claim 28 wherein the analyzer signal capable of appearing as a real-time perceivable output at the computing device's output is a sampled version of an electrical signal from a combustion engine in the motorized vehicle.

30. The motorized-vehicle diagnostic tool of claim 28 wherein the computing device further comprises peripheral devices capable of storing motorized vehicle information.

31. The motorized-vehicle diagnostic tool of claim 30 wherein the peripheral devices store ideal analyzer signals.

32. The motorized-vehicle diagnostic tool of claim 30 wherein the peripheral devices store parts lists.

33. The motorized-vehicle diagnostic tool of claim 28 wherein the computing device is capable of executing a billing program for generating invoices.

34. The motorized-vehicle diagnostic tool of claim 28 wherein the computing device is capable of executing a program completely unrelated to the analysis or display of an analyzer signal.

35. The motorized-vehicle diagnostic tool of claim 28 wherein the computing device issues commands to the motorized-vehicle analyzer to control the measuring of a condition of the motorized vehicle.

36. The motorized-vehicle diagnostic tool of claim 35 wherein the computing device is capable of executing a diagnosis program that causes the computing device to issue commands to the motorized-vehicle analyzer to measure specific conditions of the motorized vehicle at specific times.

37. The motorized-vehicle diagnostic tool of claim 28 wherein the motorized-vehicle analyzer further comprises a feature extractor for locating abnormal values of a measured condition.

38. The motorized-vehicle diagnostic tool of claim 37 wherein the feature extractor transmits abnormal values to the computing device.

39. The motorized-vehicle diagnostic tool of claim 38 wherein the computing device issues commands to the motorized-vehicle analyzer to control which classes of abnormal values are transmitted to the computing device by the feature extractor.

40. The motorized-vehicle diagnostic tool of claim 29 wherein the motorized-vehicle analyzer is capable of providing a sampled version of a single cycle of an electrical signal from the motorized vehicle to the computing device separate from the analyzer signal, which is capable of appearing as a real-time perceivable output at the computing device's output.

41. The motorized-vehicle diagnostic tool of claim 28 wherein an analyzer signal from the motorized-vehicle analyzer is synchronized to the computing device's output through synchronization signals from the computing device.

42. The motorized-vehicle diagnostic tool of claim 28 wherein the motorized-vehicle analyzer further comprises a display memory for storing samples of an analyzer signal before providing them to the computing device.

43. The motorized-vehicle diagnostic tool of claim 42 wherein the display memory is divided into at least two groups of memory locations, each group's memory locations together representing all of the pixels of one video representation of an analyzer signal, and at least one group providing samples to the computing device while at least one other group is accepting samples from another portion of the motorized-vehicle analyzer.

44. The motorized-vehicle diagnostic tool of claim 42 wherein the display memory is divided into at least two parallel sections, the at least two parallel sections together having memory locations representing all of the pixels of one video representation of an analyzer signal, the memory locations in each parallel section being addressable by memory addresses, at least one memory address common to a memory location in each parallel section.

45. The motorized-vehicle diagnostic tool of claim 44 wherein the display memory is reset by addressing memory locations in both parallel sections simultaneously.

46. The motorized-vehicle diagnostic tool of claim 45 wherein at least two digital values are retrieved simultaneously using one memory address.

47. The motorized-vehicle diagnostic tool of claim 46 wherein the simultaneously retrieved digital values are later separated in time.

48. The motorized-vehicle diagnostic tool of claim 28 wherein an analyzer signal is combined with a digital video signal from the computing device to produce a video output at the computing device's output.

49. The motorized-vehicle diagnostic tool of claim 28 wherein the motorized-vehicle analyzer further comprises a storage controller for storing values in a memory, and a production controller for reading values from the memory to produce an analyzer signal for the computing device, the storage controller comprising two conversion counters, each conversion counter incrementing its count during the process of storing values in the memory to produce a series of memory addresses for addressing memory locations in the memory, and the production controller comprising two production counters and an inverter, each production counter incrementing its count during the process of accessing digital values from the memory locations, one of the production counters producing a non-inverted count and the other production counter producing a count that is inverted by the inverter to produce an inverted count, the inverted count and the non-inverted count for addressing the memory locations.

* * * * *

UNITED STATES PATENT AND TRADEMARK OFFICE
CERTIFICATE OF CORRECTION

PATENT NO. : 6,009,360
DATED : DECEMBER 28, 1999
INVENTOR(S) : BENJAMIN P. KNAPP

It is certified that error appears in the above-identified patent and that said Letters Patent is hereby corrected as shown below:

Col. 23, line 34, delete "a,.", insert --at--

Signed and Sealed this

Tenth Day of April, 2001

Attest:

NICHOLAS P. GODICI

*Attesting Officer*     *Acting Director of the United States Patent and Trademark Office*